3,099,070
METALWORKING TOOL
Joseph T. Morrison, St. Clair Shores, Mich., assignor to Cogsdill Tool Products, Inc., Oak Park, Mich., a corporation of Michigan
Filed Mar. 1, 1961, Ser. No. 92,700
1 Claim. (Cl. 29—90)

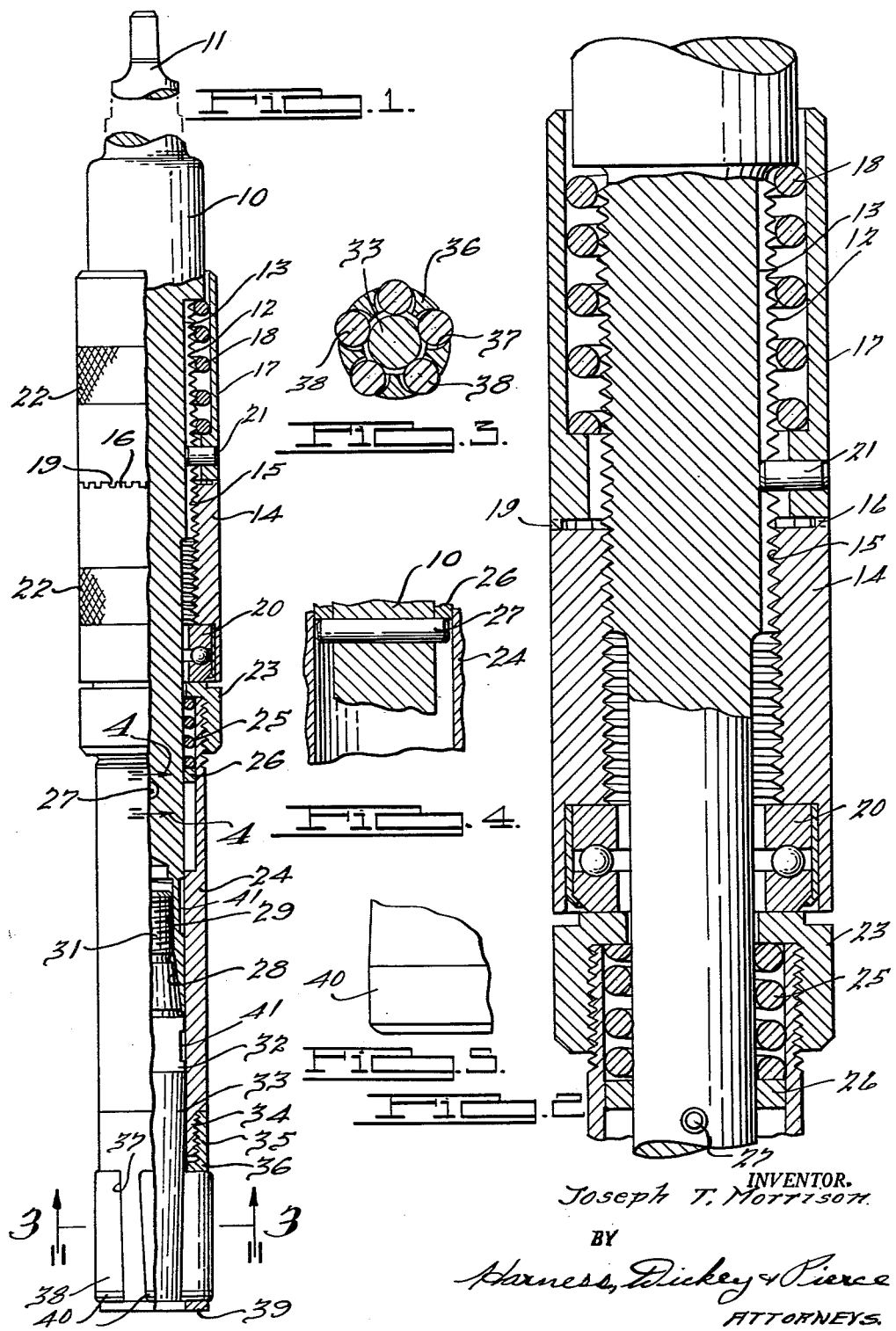

This invention relates to tools for finishing cylinder bores, and particularly to a tool having a plurality of rollers which smooth and compact the surface within a bore.

The tool of the present invention employs a hollow body having apertures extending inwardly from the forward end for receiving a plurality of tapered rollers which are tilted at a slight angle to the axis of the body. The inner surface of the rollers engages a cone-shaped adjusting element by which the rollers may be moved radially outwardly to increase the overall diameter thereof. A driving spindle extends through the sleeve and has a threaded connection with the cone-shaped adjusting element which has an exterior thread on its upper end. A rotatable sleeve is mounted on the upper end having internal threads mated with the threads on the arbor for movement longitudinally thereof. Teeth are provided outwardly of the peripheral edge which are engaged by teeth on a locking sleeve which is retained by a pin against rotation on the arbor. The locking sleeve may be moved longitudinally of the arbor against the tension of an enclosed spring for separating the engaged teeth. This permits the threaded sleeve to be rotatably adjusted on the arbor for controlling the radial adjustment of the rollers to have a desired diameter thereacross. An annular bearing is provided at the end of the threaded sleeve disposed in engagement with a collar which is threaded on the end of the hollow body. The collar retains a spring against a washer which abuts a pin extending through the body for supporting the sleeve on the arbor. The spring maintains the sleeve and the rollers movable relative to the cone-shaped adjusting element. Through the adjustment of the sleeve, the rollers are moved along the cone-shaped adjusting element which thereby expands or retracts the rollers at the end of the body.

Accordingly, the main objects of the invention are: to provide a tool with conical rollers which are tilted at a slight angle to the axis of the tool to obtain the self-feeding of the rollers through a bore when the tool and workpiece are relatively rotated; to provide a cylindrical surface at the forward enlarged ends of a plurality of rollers for engaging and working the metal of a bore surface; to provide a tool having rollers at one end and a driving and adjusting head at the other end which is substantially of the same diameter as the roller end; to bias the roller cage of a metalworking tool upwardly over a cone-shaped adjusting element to permit the latter to move upwardly relative to the rollers when the tool is withdrawn from a bore for releasing the rollers from pressure engagement therewith; and, in general, to provide a metalworking tool which is simple in construction, positive in operation and economical of manufacture.

Other objects and features of novelty of the invention will be specifically pointed out or will become apparent when referring, for a better understanding of the invention, to the following description taken in conjunction with the accompanying drawing wherein:

FIGURE 1 is a broken sectional view of a metalworking tool embodying features of the present invention;

FIG. 2 is a sectional view of the structure illustrated in FIG. 1, taken on the line 2—2 thereof;

FIG. 3 is an enlarged, broken sectional view of the central portion of the tool illustrated in FIG. 1;

FIG. 4 is an enlarged, broken sectional view of the structure illustrated in FIG. 1, taken on the line 4—4 thereof, and FIG. 5 is an enlarged broken view of the lower end of one of the rollers illustrated in FIG. 1.

Referring to the figures, an arbor 10 of cylindrical form has a driving end 11 and an external, inwardly recessed thread 12 at the upper end. The thread 12 is interrupted by a slot 13 disposed longitudinally of the arbor. An adjusting sleeve 14 has an internal thread 15 screwed upon the thread 12 for adjustment longitudinally of the arbor. The sleeve 14 has upwardly extending teeth 16 on the top edge in engaged relation with downwardly extending teeth 19 on a locking sleeve 17 disposed about the arbor. The locking sleeve extends over a spring 18 which encompasses the upper end of the recessed thread 12. The sleeve 17 is retained against rotation by a pin 21 extending within the slot 13 cut into the thread 12.

Knurled surfaces 22 are provided upon the sleeves 14 and 17 so that a firm grip may be had when moving the sleeve 17 longitudinally for separating the teeth 19 from the teeth 16 and rotating the sleeve 14 on the thread 12 for moving the sleeve 14 longitudinally on the arbor 10. A ball bearing 20 is carried in a recess within the end of a sleeve 14 in position to abut against an internally threaded collar 23 for reducing the friction occurring therewith when the sleeve 14 is rotated. The collar 23 is threaded upon the hollow stem 24 which is urged upwardly by a spring 25 seated upon a washer 26 which rests upon the ends of a pin 27 extending through the arbor 10. The arbor is provided with an aperture 28 having an internally threaded section 29 which receives the threaded end 31 of a cone-shaped adjusting element 32 having a tapered or conical end 33.

The hollow stem 24 has a threaded end 34 to which the internally threaded end 35 of a roller supporting body 36 is secured. The roller supporting body is provided with an odd number of tapered roller pockets 37 which break through the inner and outer wall of the body 36, as illustrated in FIG. 3. The rollers are tilted at the top at a slight angle to the axis of the body in the direction in which the body is rotating for the purpose of producing a force for feeding the rollers through the bore when the tool is driven in rotation and to provide a lead to the tool end. The pockets 37 are reamed on a taper to be larger at the bottom end than at the inner end portion thereof. After the rollers 38 are placed within the pockets, a retaining washer 39 is welded or otherwise secured to the bottom of the body 36 in a manner to provide a slight clearance with the ends of the rollers, sufficient to permit them to roll freely. The taper on the rollers extends substantially to the bottom thereof where a cylindrical surface 40 is provided which will vary in width for rollers of different diameters; for the diameter herein illustrated the width is approximately .07 inch. The cylindrical portions will have the bottom diameter thereof of slightly less over-all diameter across the tool than the top diameter thereof due to the slight tilting of the rollers relative to the axis of the tool body, as pointed out above. The cylindrical portions of the rollers may be considered the working portion and this portion, being in helical relation with the cylindrical wall, will automatically produce the feeding of the rollers inwardly over the surface of the bore being worked. The feeding force is overcome upon withdrawal of the tool as the conical end portion 33 is moved upwardly within the hollow stem 24, permitting the retraction of the rollers 38. From FIG. 3 it will be seen that clearance is provided between the rollers 38 and the surface of the pockets 37, permitting them to be adjusted radially a substantial amount through the movement of the conical end portion 33 longitudinally of the stem 24. For a tool having a 1" rating, the expansion may extend from .096" to 1.037" for a tool expansion of .0041".

After the tapered end 33 has been adjusted relative to the hollow stem 24 to produce a desired diameter between a roller on one side of the tool and two oppositely positioned rollers, the tool is rotated and inserted in a bore, with the cylindrical portions 40 in engagement therewith. The rollers are automatically advanced through to the bore due to the slight tilting thereof, as pointed out hereinabove. The cylindrical portions work the metal of the surface of the bore to produce a desired diameter and a finish thereto.

What is claimed is:

In a metalworking tool, an elongated arbor having drive means on one end, a conical adjusting element on the other end of said arbor, a hollow stem secured at one end on said arbor about said conical adjusting element, said stem having elongated tapered apertures in the other end breaking through the inner, outer and end walls thereof, tapered rollers in said apertures in engagement with said conical adjusting element for radial inward and outward movement, a washer on the end of said stem covering the ends of the apertures for retaining the rollers therewithin, a thread on the outer portion of the arbor, a threaded sleeve on said thread rotatable thereon for adjusting the hollow stem longitudinally of the body, a second sleeve on said arbor between said threaded sleeve and said driving end disposed in engagement with each other, the engaged edges of said sleeves having teeth therein which lock the threaded sleeve against rotation, means for retaining said second sleeve on said arbor for longitudinal movement therealong while being retained against rotational movement, and a spring about said arbor for urging said second sleeve toward said threaded sleeve for retaining said teeth in engaged relation.

References Cited in the file of this patent
UNITED STATES PATENTS

| | | |
|---|---|---|
| 1,717,720 | Martin | June 18, 1929 |
| 2,045,787 | Maupin | June 30, 1936 |
| 2,069,099 | Satterwaite | Jan. 26, 1937 |
| 2,526,025 | Hoeppe | Oct. 17, 1950 |
| 2,546,756 | Knowlton | Mar. 27, 1951 |
| 2,737,996 | Toth | Mar. 13, 1956 |
| 2,835,958 | Mock | May 27, 1958 |
| 2,843,918 | Koppelmann | July 2, 1958 |